United States Patent [19]
Issidorov

[11] Patent Number: 5,948,138
[45] Date of Patent: Sep. 7, 1999

[54] METHOD AND APPARATUS FOR STIRRING OF MOLTEN METAL USING ELECTROMAGNETIC FIELD

[75] Inventor: Eduard A. Issidorov, Riga, Latvia

[73] Assignee: International Procurement, Inc., Wexford, Pa.

[21] Appl. No.: 09/089,725

[22] Filed: Jun. 3, 1998

Related U.S. Application Data

[60] Provisional application No. 60/054,365, Jul. 31, 1997.

[51] Int. Cl.[6] ............................. C22B 9/187; C22B 9/22
[52] U.S. Cl. ..................... 75/10.13; 75/10.14; 75/10.16; 75/10.18; 75/10.67; 266/234; 266/237; 373/146
[58] Field of Search .................................. 266/234, 237; 75/10.14, 10.15, 10.16, 10.67, 10.18; 373/146

[56] References Cited

U.S. PATENT DOCUMENTS

| | | | |
|---|---|---|---|
| 3,311,361 | 3/1967 | Zepernick | 266/234 |
| 5,385,338 | 1/1995 | Sato et al. | 266/234 |
| 5,462,572 | 10/1995 | Tallback | 75/10.16 |

*Primary Examiner*—Melvyn Andrews
*Assistant Examiner*—Tima M. McGuthry-Banks
*Attorney, Agent, or Firm*—Shanley and Baker

[57] ABSTRACT

Method and apparatus for controlling stirring of molten metal(24) during processing in a metallurgical vessel(20), free of mechanical-contact with the molten metal(24). Efficiencies of metal processing and improvements in metallurgical properties are achieved by selecting configurations and placement of interacting apparatus(40), and by controlling electromagnetic field characteristics. Apparatus(40) can be retrofitted to an existing vessel and a reduction in vessel maintenance results from a decreased rate of slag buildup during usage.

18 Claims, 11 Drawing Sheets

METHOD AND APPARATUS FOR STIRRING OF MOLTEN METAL USING ELECTROMAGNETIC FIELD

CROSS-REFERENCE TO RELATED APPLICATION

This Application claims the benefit of U.S. Provisional Application No. 60/054,365, filed Jul. 31, 1997.

INTRODUCTION

This invention relates to metallurgical methods and apparatus for improving the efficiency of molten metal processing. More particularly, this invention is concerned with achieving a stirring action in molten metal, while within a metallurgical vessel, free of mechanical-contact stirring means.

OBJECTS OF THE INVENTION

A primary objective is to achieve stirring of molten metal, within a vessel used for metallurgical processing, from externally of such vessel without mechanical action stirring means. Part of that objective is to improve uniformity of composition and temperature during molten metal processing. Benefits include decreasing (i) processing time, (ii) heat energy consumption, and (iii) vessel maintenance requirements; and more efficiently achieving desired metallurgical properties.

One measure for more effectively achieving that objective is to limit stirring to selected portions of molten metal in the vessel while providing for selectively operable cyclical stirring which assists in achieving desired molten metal characteristics.

The above and other advantages and contributions of the invention are considered in more detail in describing embodiments of the invention as shown in the accompanying drawings.

DETAILED DESCRIPTION OF THE INVENTION

The invention has utility on metallurgical vessels such as ladles for treating molten metal and furnaces for processing molten metal.

In a specific embodiment for describing the invention, a vessel heated by gas or oil burning means is used for processing molten aluminum. Such means is referred to as a reverberatory furnace and the processes carried out can include melting (such as scrap or ingots), refining, alloying, etc.

Figure 1:
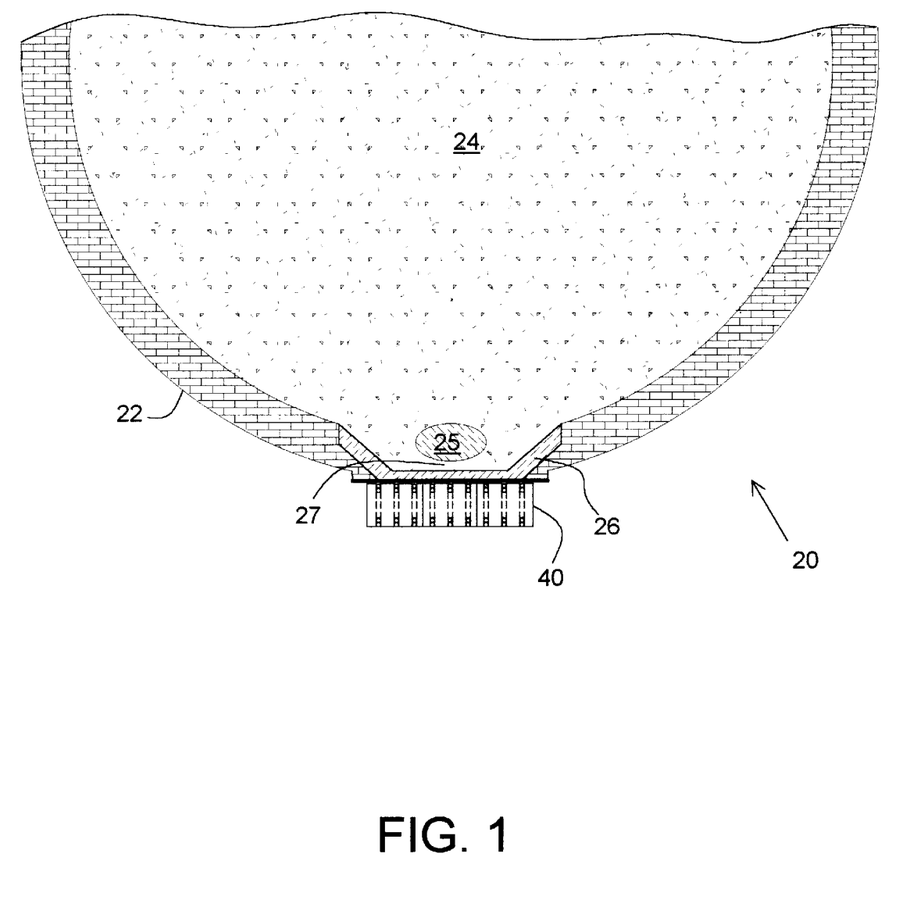
FIG. 1 is a schematic horizontally-oriented sectional partial plan view of a vertically-oriented molten metal vessel for describing location of apparatus in accordance with a specific embodiment of the invention.

In the plan view of FIG. 1, an upright vessel 20, with periphery located refractory lining 22, contains molten metal 24. Solid metal, such as scrap, new metal or alloying additions, can be included in the molten metal during processing.

A preferred embodiment of the invention for establishing a stirring action in the molten metal is shown in FIG. 1. Furnace structure forms part of the invention; and, because of location contiguous to peripheral refractory lining, can be readily retrofitted on an existing furnace with minor structural modifications. Although the invention is described in combination with a furnace having a substantially circular cross section as viewed in a horizontal plane, it is not limited to use on a furnace having such configuration. Uses also include in combination with rectangularly-shaped vessels (not shown). Placement of apparatus of the invention on such vessels is substantially centered in a wall of the vessel having the longer dimension.

Figure 2:
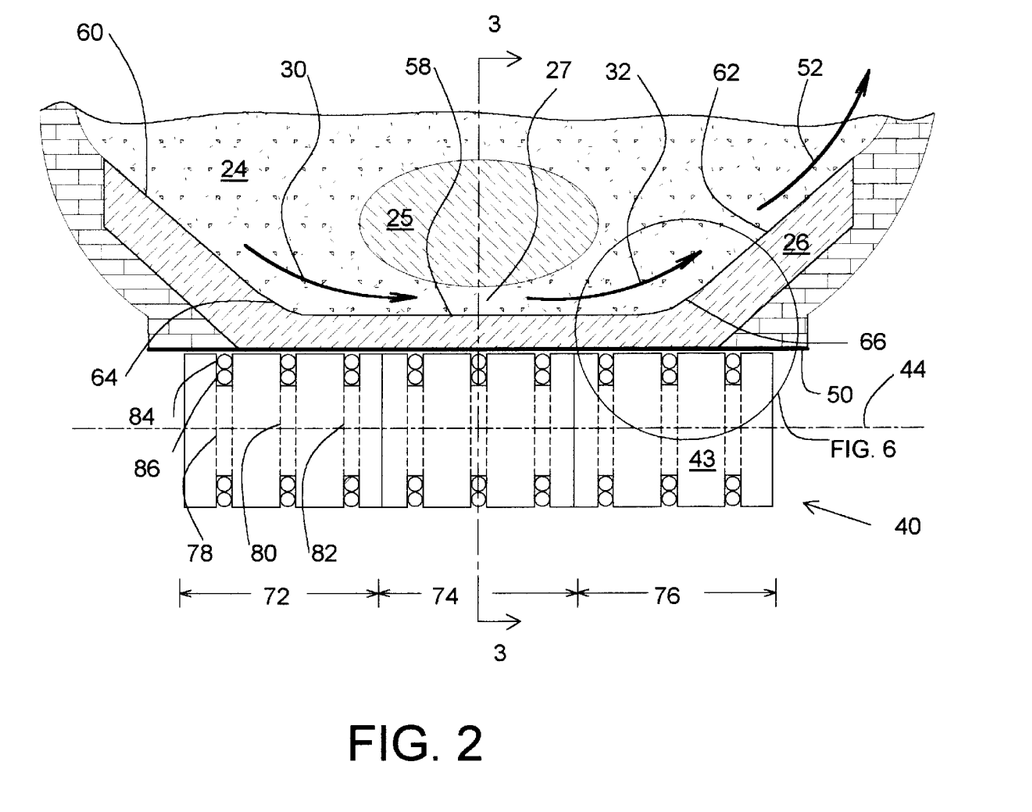
FIG. 2 is an enlarged view of a portion of the structure of FIG. 1 for describing stirring movement and vessel structure of the invention in more detail.

As shown in more detail in the enlarged partial view of FIG. 2, an access area is defined in part by modification of peripheral refractory lining 22. A vertically-oriented column 25 provides access for movement of metal 24, from the main body of molten metal, between column 25 and wall configured structure 26. Such column and wall define a passageway 27. Directional movement of the molten metal is indicated by arrows 30 and 32. Such metal flow into and out of the defined passageway initiates a generally-circular horizontally-oriented stirring action which is initially peripheral about the vessel. But, secondary movement of centrally-located molten metal into such peripheral flow is generated. In rectangularly-configured vessels, such secondary movement also occurs in molten metal located in corner areas of the vessel.

Figure 3:
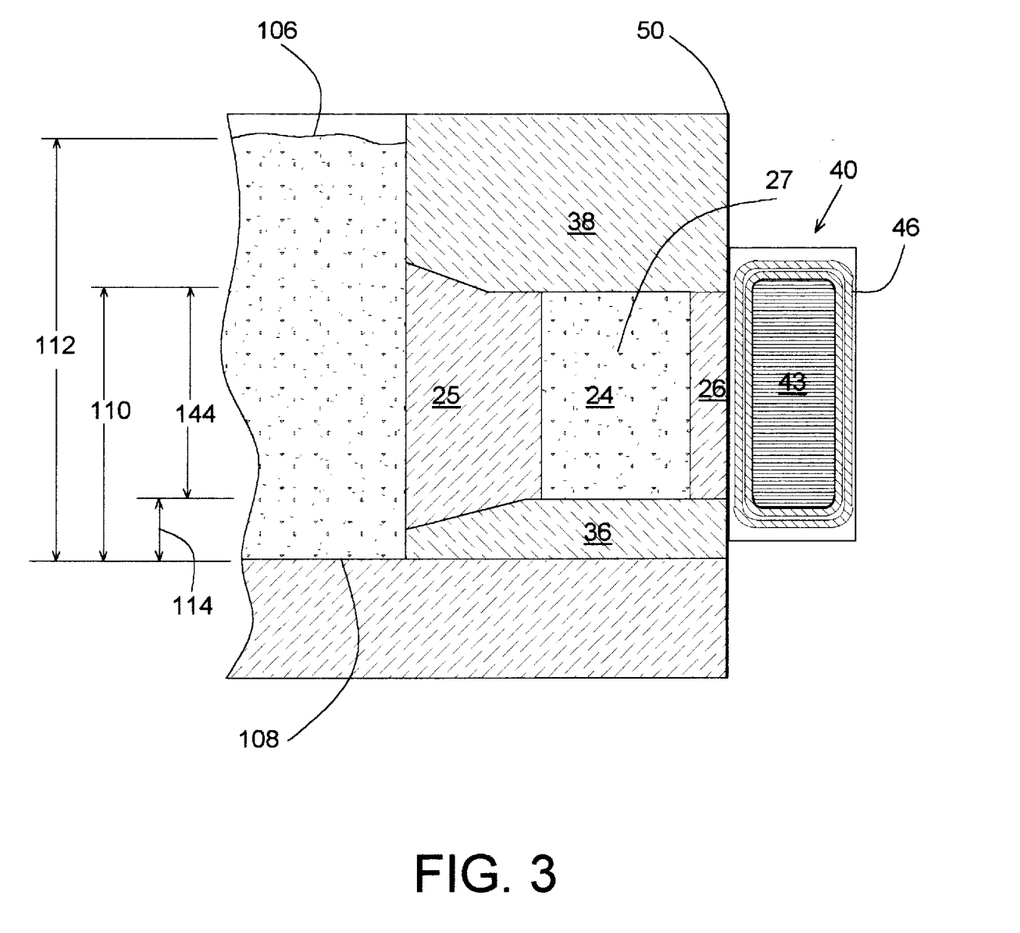
FIG. 3 is a cross-sectional view of the structure of FIG. 2, taken in a vertically-oriented plane indicated by interrupted line 3—3 of FIG. 2.

Passageway wall 26 is generally vertically-oriented, as shown in FIG. 3, and generally horizontally-oriented components 36 (floor) and 38 (ceiling) define the confined passageway for molten metal 24. Such structural components, column 25, sidewall 26, lower wall 36, and upper wall 38 are formed from a refractory material having properties to withstand the temperature and reactive properties of the molten metal.

During metallurgical processing, molten metal from the furnace vessel is free to fill such passageway. A source of magnetic flux 40 (FIGS. 2 and 3) establishes a linearly-extending magnetic field in the molten metal in the defined passageway between columnar structure 25 and vertical wall 26. Lines of magnetic flux 42, established by source 40, are concentrated as shown schematically at 42 in FIG. 4. Molten metal in such passageway acts as a magnetic core exhibiting magnetic hysteresis (due to a cyclical alternating electrical excitation), a magnetization curve, and eddy currents due to cyclical variations of the applied magnetic field.

Figure 5:
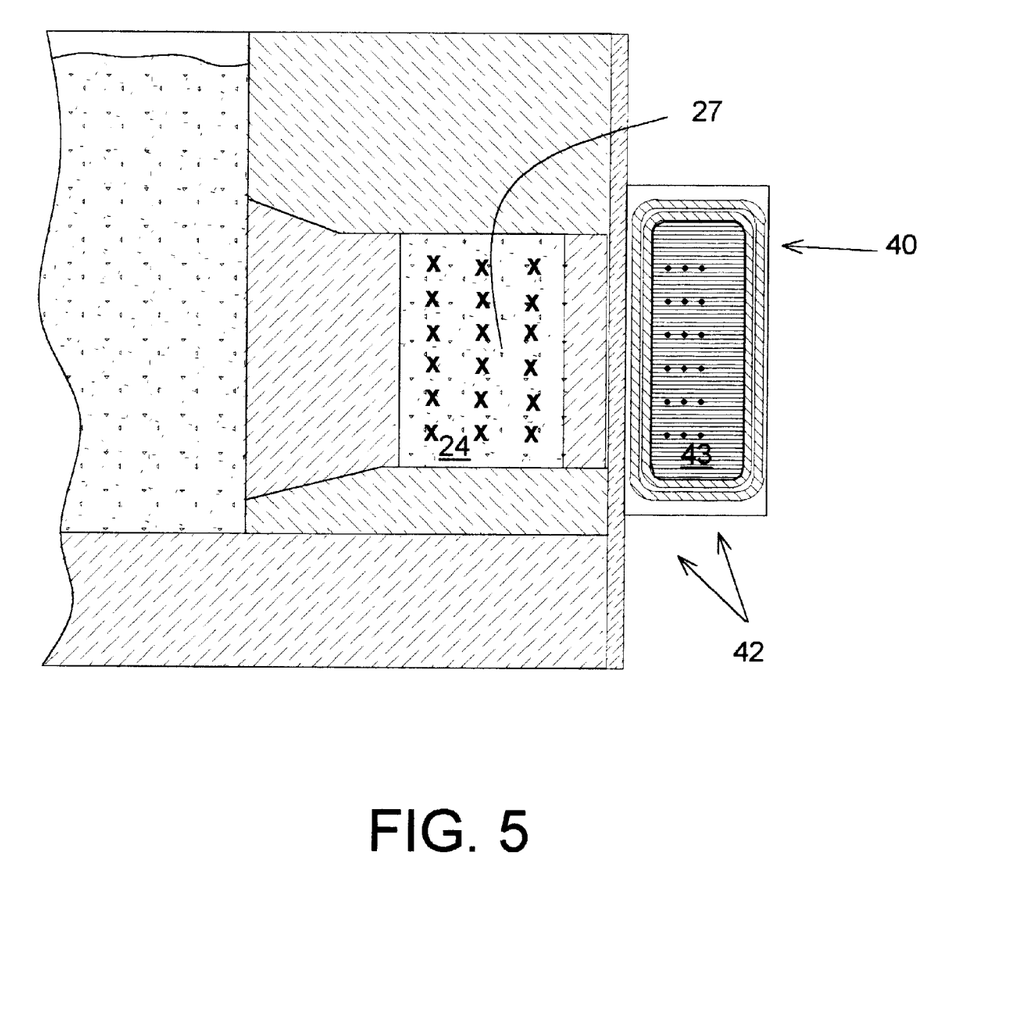
FIG. 5 is a cross-sectional view of FIG. 4, taken in a vertically-oriented plane indicated by interrupted line 5—5 of FIG. 4, for added description of establishment of stirring forces of the invention.

In FIG. 5, the lines of magnetic flux (indicated generally by 42) are shown schematically in the passageway molten metal 24 and in core 43 of the magnetic field source.

Figure 4:
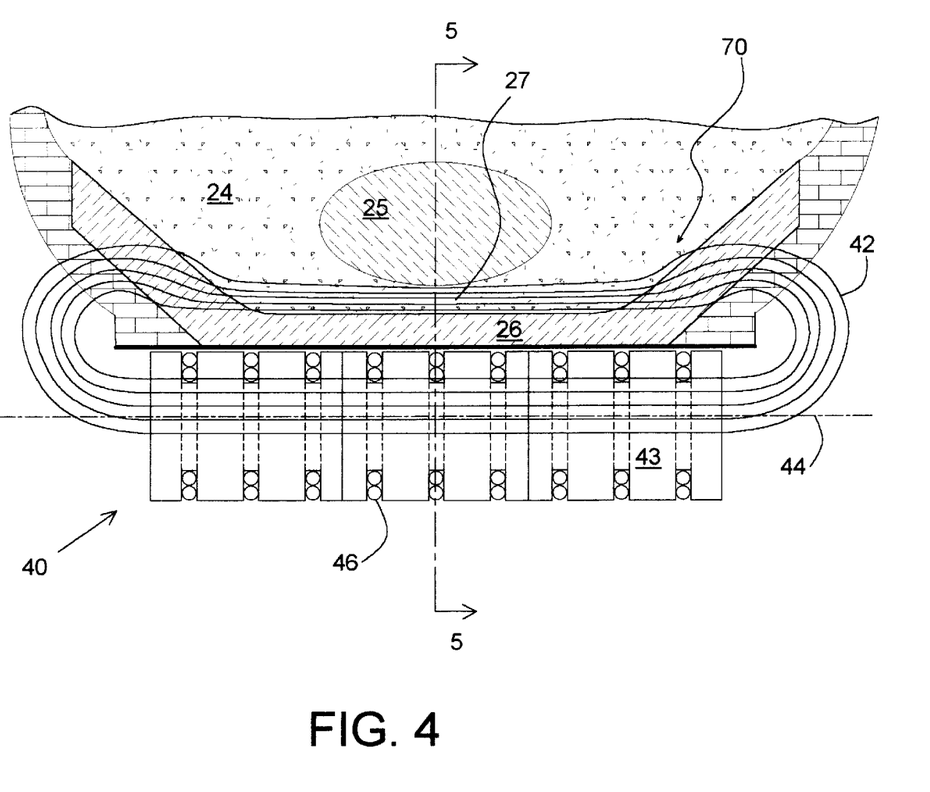
FIG. 4, similar to FIG. 2, omits metal directional movement indicators for purposes of describing establishment of stirring forces of the invention.

In FIG. 4, a longitudinally-extended axis for the magnetic field source 40 is indicated at 44. In both FIGS. (4 and 5), other lines of magnetic flux associated with the magnetic field source 40, which are not established in the molten metal (24) within the passageway, are not shown. Such longitudinal axis is central of water-cooled electrical conducting windings, such as 46 shown in FIGS. 3 and 4. Magnetic field source 40 comprises a plurality of such windings in which an alternating electric current is established. Such water-cooled windings are wound in a horizontal arrangement, with selected spacing between windings, about core 43 (FIGS. 3 and 4).

Alternating electrical current established in such water-cooled electrical windings establishes magnetic field as schematically indicated by the lines of magnetic flux 42 of FIG. 4.

In a preferred embodiment, core 43 of the magnetic field source comprises thin sheets of grain-oriented silicon steel having a high magnetic permeability. Windings, such as 46, comprise aluminum or copper tubing through which a coolant flows. Such tubing is insulated electrically on its surface to prevent grounding and short circuiting. The entire magnetic field source 40 is attached to mounting plate 50 (FIGS. 2 and 3) for ease of attachment to the furnace and oriented, as shown in FIG. 2, along the passageway established by columnar structure 25 and vertically-oriented refractory wall 26.

In a preferred embodiment, current is established in the windings by three-phase alternating voltage with a potential selected in a range of about 380 to 460 volts, an alternating frequency of about 50–60 cycles per second, and an electrically out-of-phase relationship between selected windings (described below). Power requirement for such source is from about 55–65 kilowatts for a 40 metric ton furnace to about 90–100 kilowatts for a 100 metric ton furnace. Such alternating electrical current in the windings of magnetic field source 40 establishes a changing magnetic flux in molten metal (24) within the defined passageway. Such changing magnetic flux in the molten metal, which acts to concentrate the flux, establishes eddy currents within such molten metal at the selected frequency; however, 180° out-of-phase with the alternating current in the windings, such as 46 of magnetic field source 40. Movement of the molten metal in a substantially horizontal direction within the passageway results.

An important contribution of the invention is proper selection of 1) characteristics and dimensions of the magnetic field source, and 2) characteristics and dimensions of the passageway. Without such proper selections and specified relationship between them, metal stirring is turbulent and primarily limited to molten metal within the passageway and within a small portion of the furnace contiguous to the passageway.

A preferred flow pattern of metal is indicated in FIG. 2 at 30, 32 and 52 which is a substantially laminar flow out of the passageway resulting in a flow of molten metal around the entire periphery of the furnace. Such laminar flow depends on proper selection of molten metal velocity, length of magnetic influence relative to dimensional characteristics of portions of the passageway, angle of portions of the passageway in relation to the longitudinal axis of the magnetic field source, portion of the molten metal within the furnace subject to the stirring action and other factors.

To provide for such laminar flow, the longitudinal axis of the magnetic field source is made parallel to a uniform thickness central portion of passageway wall 26. Such central portion is indicated at 58 of FIG. 2 and has a thickness, in a preferred embodiment, in a range of about 7–10 centimeters as measured perpendicularly from mounting plate 50. Each passageway wall end portion 60 and 62 presents a selected angled relationship with such longitudinal axis of the magnetic field. Intermediate transition wall portions 64, 66 connect each end portion to form a smooth transition from the central portion of the passageway wall.

Figure 6:
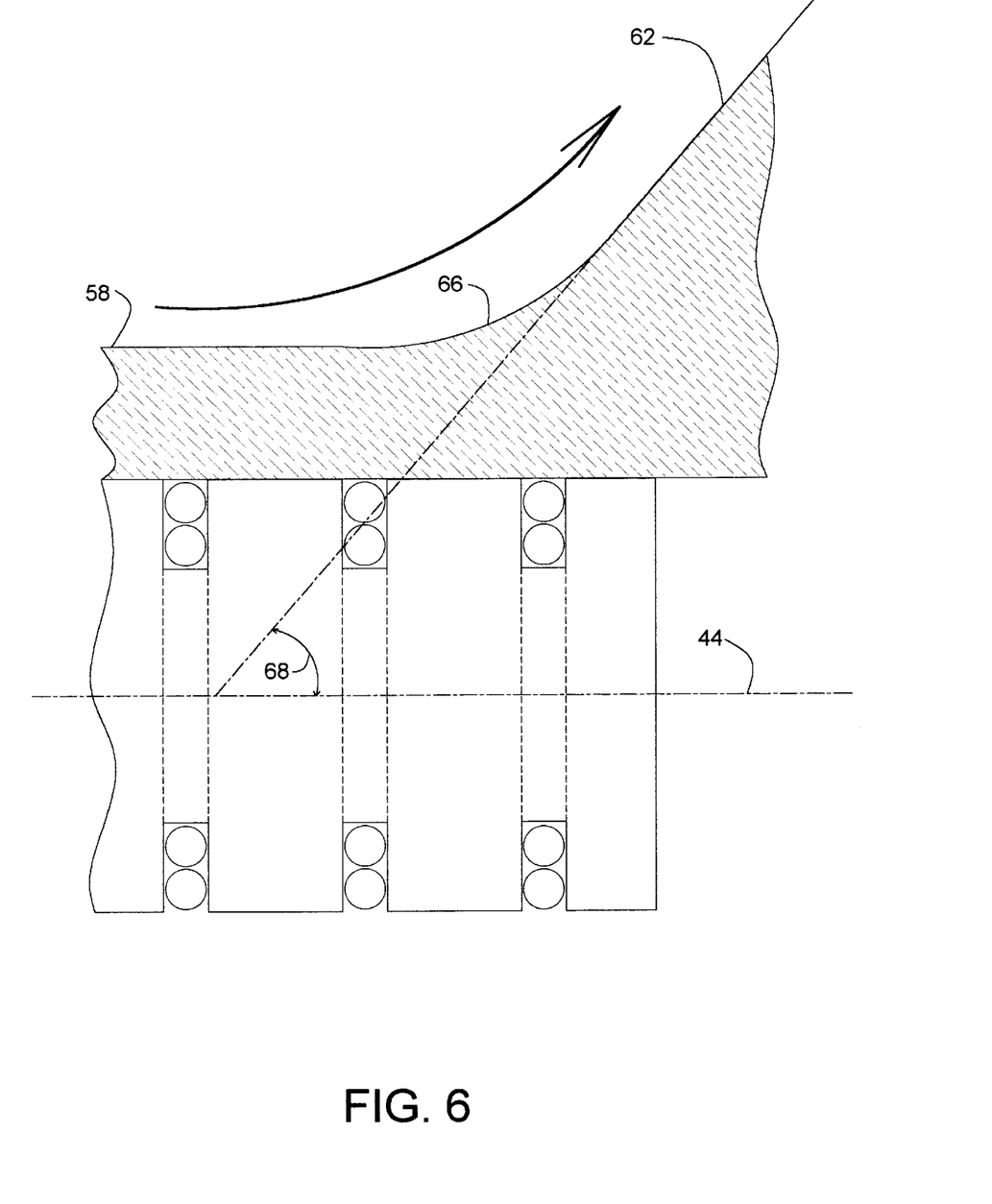
FIG. 6 is an enlarged horizontally-oriented sectional partial view of a portion of the structure of FIG. 2, at a location indicated by a circle labeled FIG. 6 in FIG. 2, for more detailed description of a portion of the vessel structure in accordance with the invention.

The enlarged sectional partial view of a portion of the passageway wall, shown in FIG. 6, indicates angle 68 between such passageway wall end portion 62 and the longitudinal axis 44 of the magnetic field source. The location of the enlarged area shown in FIG. 6 is indicated in FIG. 2 by a circle labeled FIG. 6.

A preferred angle between such longitudinal axis 44 and such end wall portion 62 of the passageway is in a range of about 10° to 40°. Angles outside such range result in a reduction in stirring effectiveness compared with angles selected within the preferred range.

Table I provides temperature gradient measurements made in a 40 ton furnace at variations in the angle between such end wall portion and longitudinal axis for selected time periods of stirring.

TABLE I

| Angle | Duration of Stirring (min) | Gradient of Temperature (°C.) |
| --- | --- | --- |
| 0° | 60 | 15 |
| 10° | 50 | 10 |
| 20° | 50 | 0 |
| 30° | 50 | 0 |
| 40° | 50 | 10 |
| 50° | 60 | 25 |

Such measurements indicate improved stirring (lower gradients of temperature) for the preferred range of angles.

The length of such substantially planar uniform thickness central wall section, 58 of FIG. 2, relative to the length of the magnetic field source 40 is also an important contribution of the invention. In FIG. 2, magnetic field source 40 extends beyond such central wall portion. Extension of the magnetic field source beyond the length of the central wall portion results in the magnetic field strength being at a reduced level at the end portions of the passageway wall. Such reduced level is due to the increased distance between the magnetic field source and the molten metal as such metal is guided along the intermediate wall towards the end wall portion of the passageway. As the molten metal is moved by the magnetic force and guided along such wall portions, it is influenced by a decreasing level of magnetic field influence.

Such decreasing level is depicted by the increased spacing of lines of magnetic flux at 70 of FIG. 4.

Other means, in addition to passageway wall characteristics, are carried out to reduce turbulence and promote desired laminar flow of such molten metal. Such means include characteristics of the magnetic field and presence and direction of magnetic field influence.

Characteristics of the magnetic field, which are selected to provide for such preferred laminar flow, are its strength and a factor referred to as "magnetic field travel effect." Selection of an electrical circuit and magnetic field source windings, which are properly spaced and are out-of-phase electrically relative to adjacent windings, produces a magnetic field having specific travel effect characteristics. Selecting such phase relationships and dimensional spacing between windings establishes magnetic field travel effect characteristics of optimum value.

Such out-of-phase relationship for the windings is described in relation to FIG. 2. Portions of the magnetic field source, indicated as 72, 74 and 76, are each referred to as poles. Each pole in the embodiment described in relation to FIG. 2 has three groups of windings with two windings in each group. Such groups of windings in pole 72, for example, are indicated at 78, 80, 82. Within each group are two windings such as 84 and 86. Windings such as 84, 86, within a single group of windings, are in-phase electrically. However, winding group 78 is out-of-phase with winding group 80 by 60° and winding group 80 is out-of-phase with winding group 82 by 60°. Such 60° difference in electrical phase exists between each winding group within a pole.

Figure 7:
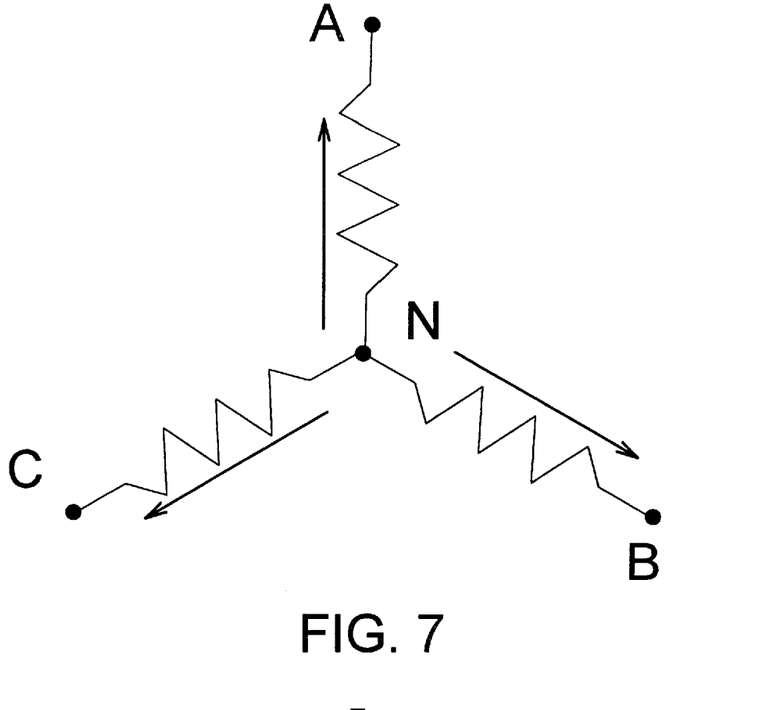
FIG. 7 is a schematic diagram for describing cyclical electrical power as selected for a preferred embodiment of the invention.
Figure 8:
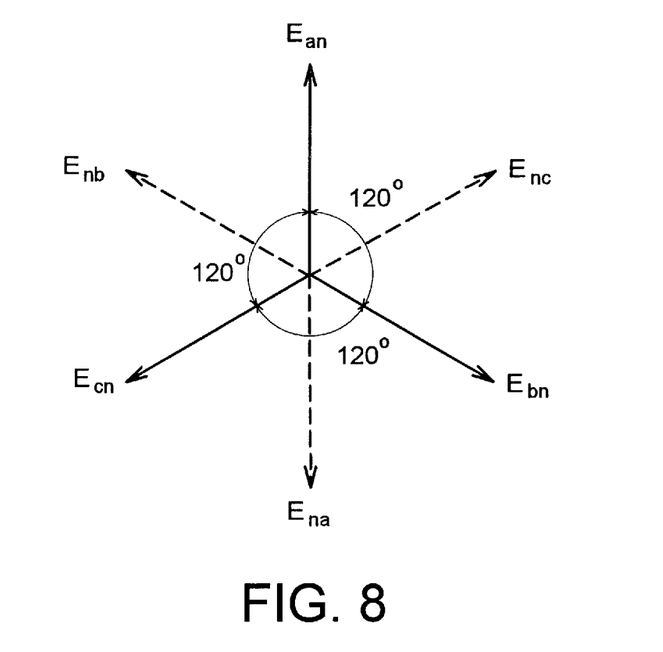
FIG. 8 is a vector diagram for further describing functioning of such selected cyclical electrical power cycles of FIG. 7.

Means for providing an electrical circuit with such phase relationships is described in relation to FIGS. 7 and 8. FIG. 7 is a schematic diagram of a symmetrical three-phase electrical connection referred to as a "star connection." Letters A, B and C represent three conductors of a three-phase power source with a neutral connection N.

FIG. 8 shows phase EMF's of the electrical connection of FIG. 7 wherein each EMF, designated $E_{an}$, $E_{bn}$, $E_{cn}$ is 120° out-of-phase with each other. $E_{nc}$, $E_{na}$, $E_{nb}$ are also out-of-phase 120° with each other and, in turn, $E_{an}$ is out-of-phase 60° with $E_{nc}$; $E_{nc}$ is out-of-phase 60° with $E_{bn}$; $E_{bn}$ is out-of-phase 60° with $E_{na}$, etc.

Figure 9:
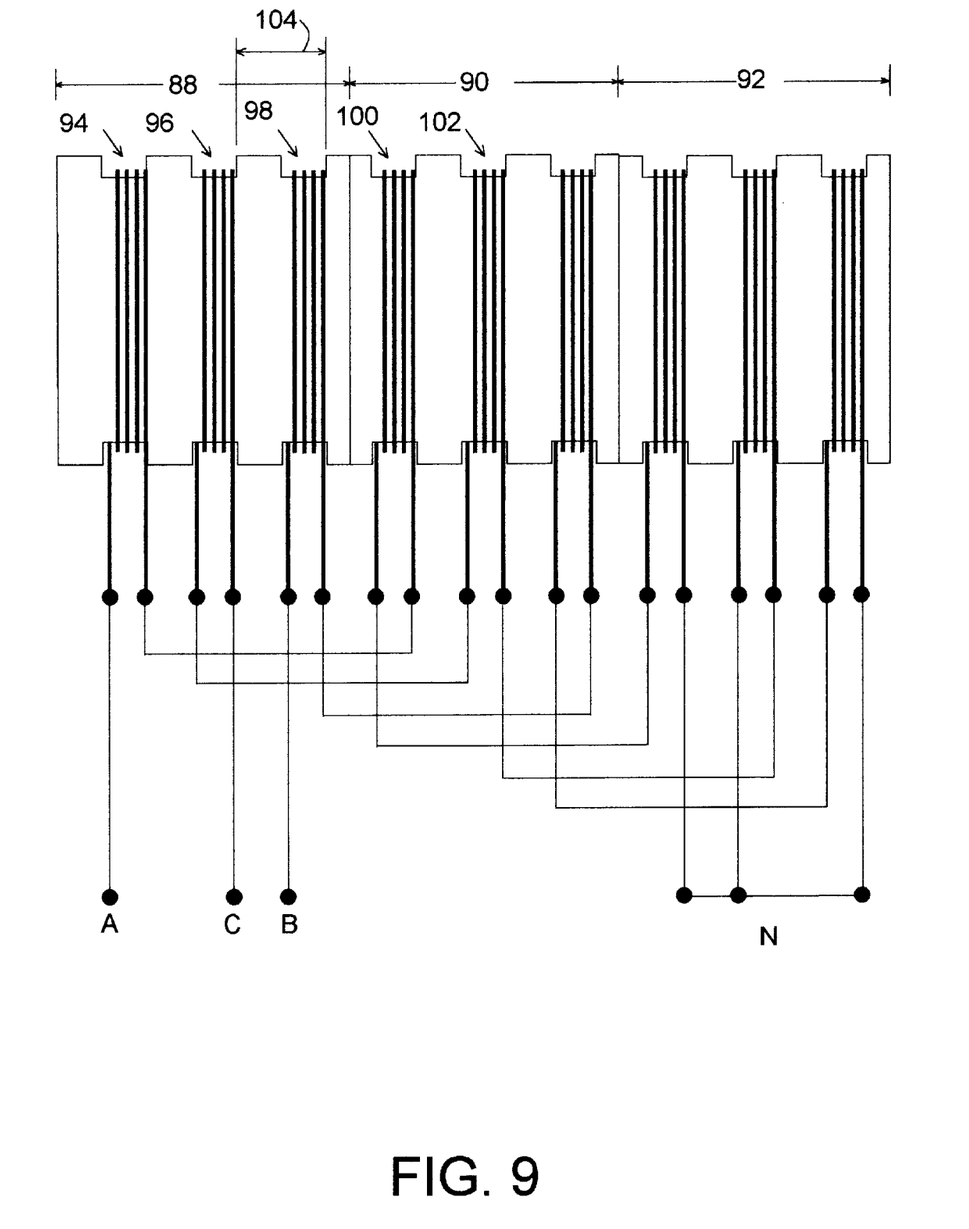
FIG. 9 is an electrical circuit diagram for carrying out the invention utilizing the selected cyclical electrical power of FIGS. 7 and 8.

A preferred embodiment of an electrical circuit to provide such phase relationship in a magnetic field source is shown in FIG. 9. Such magnetic field source embodiment comprises three poles, 88, 90, 92, each having three winding groups, such as 94, 96, 98 in pole 88, and four windings within each winding group (indicated by bold lines).

Referring to FIGS. 8 and 9, means for establishing such out-of-phase relationship between groups of windings is described. Winding group 94, with electrical power connection A at the beginning of the winding and N at the end of the winding, has a phase angle indicated in FIG. 8 at vector $E_{an}$ (subscript "$_{an}$" denoting, by convention, electrical connection starting at "$_a$" and ending at "$_n$"); winding group 96, with electrical connection N at the beginning of the winding and C at the end of the winding, has a phase angle indicated in FIG. 8 at vector $E_{nc}$ (60° out-of-phase with $E_{an}$); winding group 98, with electrical connection B at the beginning of the winding and N at the end of the winding, has a phase angle indicated in FIG. 8 at vector $E_{bn}$ (60° out-of-phase with $E_{nc}$). Such electrical connection pattern continues for all poles of the magnetic field source depicted in FIG. 9. For example, winding group 100, with electrical connection N at the beginning of the winding and A at the end of the winding, has a phase angle indicated in FIG. 8 at vector $E_{na}$. Winding group 102, with electrical connection C at the beginning of the winding and N at the end of the winding, has a phase angle indicated in FIG. 8 at vector $E_{cn}$ (60° out-of-phase with $E_{na}$).

Such electrical connection pattern provides for each winding group to be out-of-phase with each adjacent group by 60°. Also, the first winding group in each pole is 180° out-of-phase with the first winding group in each adjacent pole (for example, vector $E_{an}$ relative to vector $E_{na}$). Such 180° out-of-phase relationship determines a boundary of the pole in describing the invention. In the preferred embodiment described in relation to FIG. 9, three poles comprise the magnetic field source. In practice of the invention, a magnetic field source is comprised of two or more poles.

By providing such phase relationship between winding groups and providing a selected distance between winding groups, the magnetic field travel effect characteristic is established. Such travel effect is dependent upon the phase difference between adjacent winding groups and distance between winding groups which can be expressed as $$V=2(f)(\pi/\phi)(l)(n)$$

where:

V is magnetic field travel effect in meters/sec;

f is electrical power frequency in cycles/sec;

φ is phase difference between winding groups expressed in radians (60°=π/3 radians);

l is the distance between groups of windings in meters (such as indicated at 104 in FIG. 9);

n is the total number of windings in a winding group.

In the embodiment depicted in FIG. 9, such factors are selected to be:

f=60 cycles/sec.;

φ=60° or π/3 radians;

l=0.035 meters.

n=4 windings

The magnetic field travel effect for such embodiment is: [(2)(60)][(π)/(π/3)][(0.035)(4)]=50.4 meters/sec.

The preferred range for magnetic field travel effect, as taught by the invention, is between about 30–70 meters per second.

The second important magnetic field characteristic is the field strength; the magnetic field is established at a strength in the range of about 800–1600 gauss. A teaching of the invention is a relationship between such magnetic field strength and the travel effect of the magnetic field. Such relationship is: $(B)(\sqrt{V})$ and is in the range of about 5,000–10,000 where:

B is magnetic field strength in gauss;

V is magnetic field travel effect in meters/sec.

In the example above, (magnetic field travel effect of 50.4 meters/sec) with a field strength of 1000 gauss, the value of such relationship is: $(1000)=(\sqrt{50.4})$ (1000) (7.10)=7100.

Maintaining such preferred value between about 5,000–10,000, enables use of a passageway and magnetic field source of reduced dimensions, in comparison with a size required when other values are used. Such reduced dimensions decrease thermal loses through the wall of the passageway.

In addition to controlling magnetic field strength and magnetic field travel effect, the direction of molten metal flow is varied in carrying out the invention. Such direction is controlled by reversing the direction of current established in the windings of the magnetic field source. Such directional change is made by switching means controlling the electrical circuit.

Maximum stirring action of the molten metal and promotion of such laminar flow is achieved when magnetic field influence is present intermittently. Such intermittent influence differs, for example, at a beginning stage of a process in relation to an ending stage or an intermediate stage of the process. Also, the nature of the process being carried out may require differing intermittent periods of influence.

In a preferred embodiment for melting aluminum in a reverberatory furnace, stirring is started after a temperature in the passageway reaches the aluminum melting point and molten metal is present. Initially, the duration of magnetic field influence is in a range from about 20–60 seconds with a period of non-influence in a range from about 60–180 seconds.

Following two or three cycles of such influence/non-influence pattern, molten metal direction of flow is reversed and two or three similarly timed cycles are carried out. Such cyclic and reversing pattern is carried out as an increasing amount of the metal within the furnace becomes molten. As molten metal becomes a major portion of the metal within the furnace vessel, duration of non-influence is progressively decreased to a range of about 20–40 seconds and duration of influence is increased to about 10 minutes, with reversal of molten metal direction of flow taking place after each cycle.

In addition to providing for more uniform temperature and uniform composition of the molten metal contained in the furnace vessel, such cycling and reversal of flow direction decrease rate of slag buildup along the furnace lining and surfaces of the passageway. Such decrease in buildup reduces downtime required for removal of such slag buildup.

An additional feature of the invention is to limit such molten metal stirring to a portion of the furnace which does not include: 1) metal contiguous to an upper surface of the molten metal in the furnace vessel, 106 of FIG. 3; and 2) molten metal contiguous to a bottom surface of the furnace, 108 of FIG. 3.

The upper surface metal within the furnace is exposed to oxidizing elements of the atmosphere. Following oxidation of such upper surface metal which is exposed to the atmosphere, the formed oxide layer provides a protective layer to significantly reduce additional oxidation of molten metal below such oxidized upper surface. It is advantageous to not disturb such protective layer while providing stirring below such layer. Horizontally-oriented passageway ceiling portion 38 of FIG. 3 acts as a baffle and substantially limits stirring action to molten metal below such upper surface. In a preferred embodiment, ceiling location dimension measured from the furnace bottom surface, indicated at 110, has a value of about 0.7 times the depth of the metal within the furnace (indicated at 112 in FIG. 3).

Also, to minimize frictional resistance to flow caused by the furnace bottom surface (108 of FIG. 3) or caused by slag buildup on such surface, passageway floor portion 36 (FIG. 3) is provided at a selected dimension above the bottom surface of the furnace and acts as a baffle to significantly reduce such flow. Such dimension, indicated at 114, has a value of about 0.1 times the depth of the metal within the furnace (indicated at 112 in FIG. 3).

Maximum stirring efficiency is obtained by proper selection of 1) magnetic field strength, 2) magnetic field travel effect, 3) cyclic pattern of magnetic field influence, 4) direction of magnetic field influence, 5) dimensional characteristics of the passageway and their relationship to the magnetic field source, and 6) portion of the molten metal within the furnace subjected to stirring.

Operational benefits realized from such stirring process of the invention include: 1) 20–40% reduction in loss of metal during processing due to such oxidation preventing means and such reduction of buildup on furnace surfaces; 2) processing time decreases of 15–30% and thermal energy requirement reduction of 10–15%, due to such improved homogeneity of temperature; 3) furnace maintenance requirements reduced, due to such pulsing metal flow and reversal of flow, preventing slag buildup on furnace vessel surfaces; and 4) metal composition homogeneity improvement due increased amount of metal subjected to the stirring action resulting from laminar metal flow.

Reverberatory furnace vessel capacity can range from about 30 metric tons to more than about 100 metric tons of metal. Various embodiments of passageway characteristics are preferred to achieve maximum efficiency in each such differing capacity furnaces.

Passageways are modified with means to change the pattern of molten metal flow along the wall of the passageway whereby the quantity of metal stirred is optimized.

Figure 10:
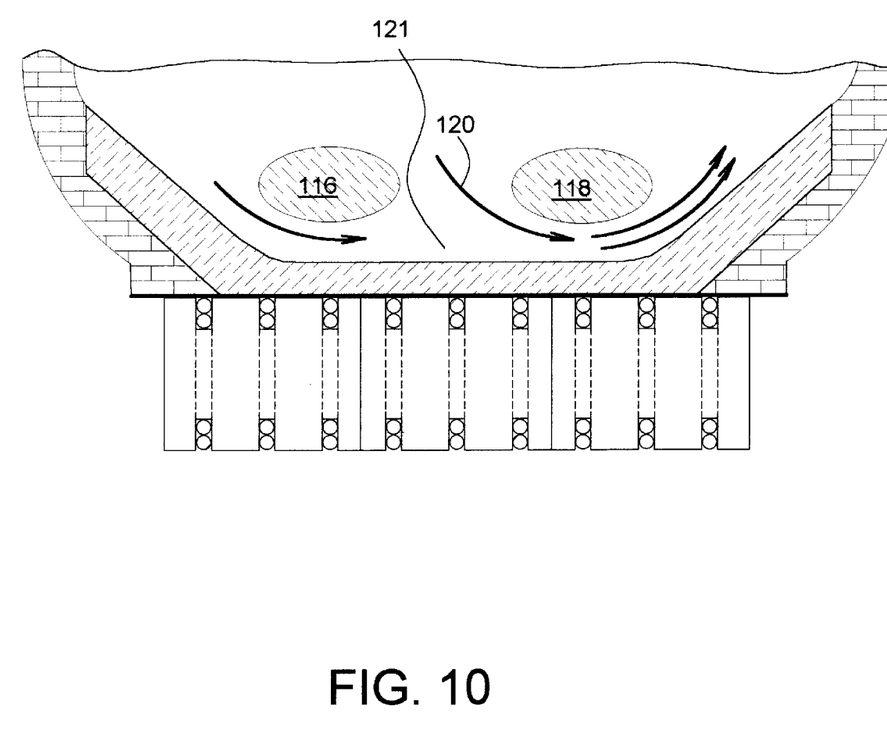
FIG. 10 is an enlarged horizontally-oriented cross-sectional partial view of another embodiment of the invention for describing modified stirring.

An embodiment, depicted in FIG. 2, is preferred for reverberatory furnaces in the range of about 30 metric tons to about 70 metric tons and presents column 25 in the passageway. In FIG. 3, such column is viewed in a vertically-oriented section taken in a plane indicated by interrupted line 3—3 of FIG. 2. In the preferred embodiment, the column presents an elliptical cross section in plan view (FIG. 2). Such column is fabricated of a refractory material and extends vertically from the passageway floor to the passageway ceiling. Such elliptical shape causes molten metal being stirred to encounter the narrowest path at a central portion of the passageway wall, at 58, and widening paths both leading into and exiting from such narrow portion. Such changing dimensions result in molten metal having a maximum velocity at such central portion, thus a reduced pressure, which causes metal to be sucked into such portion. And, as the metal exits such narrow portion, the velocity decreases (due to the wider cross section) and promotes a more laminar, less turbulent molten metal flow advancing into the furnace vessel. Such velocity and pressure relationships follow laws of pressure and velocity for an incompressible fluid. In another embodiment, depicted in FIG. 10, two columns 116 and 118, each having an elliptical cross section as viewed in the horizontal cross section, extend from the passageway floor to the passageway ceiling. Such embodiment is preferred for reverberatory furnaces having a metal capacity in the range of about 70 metric tons to about 100 metric tons or larger. The elliptical shape of each column provides the stirring advantages described in relation to the single column embodiment depicted in FIG. 2; additionally, molten metal from a central portion of the furnace, as depicted by indicator 120 (FIG. 10), is included in the metal being sucked into passageway 121.

Figure 11:
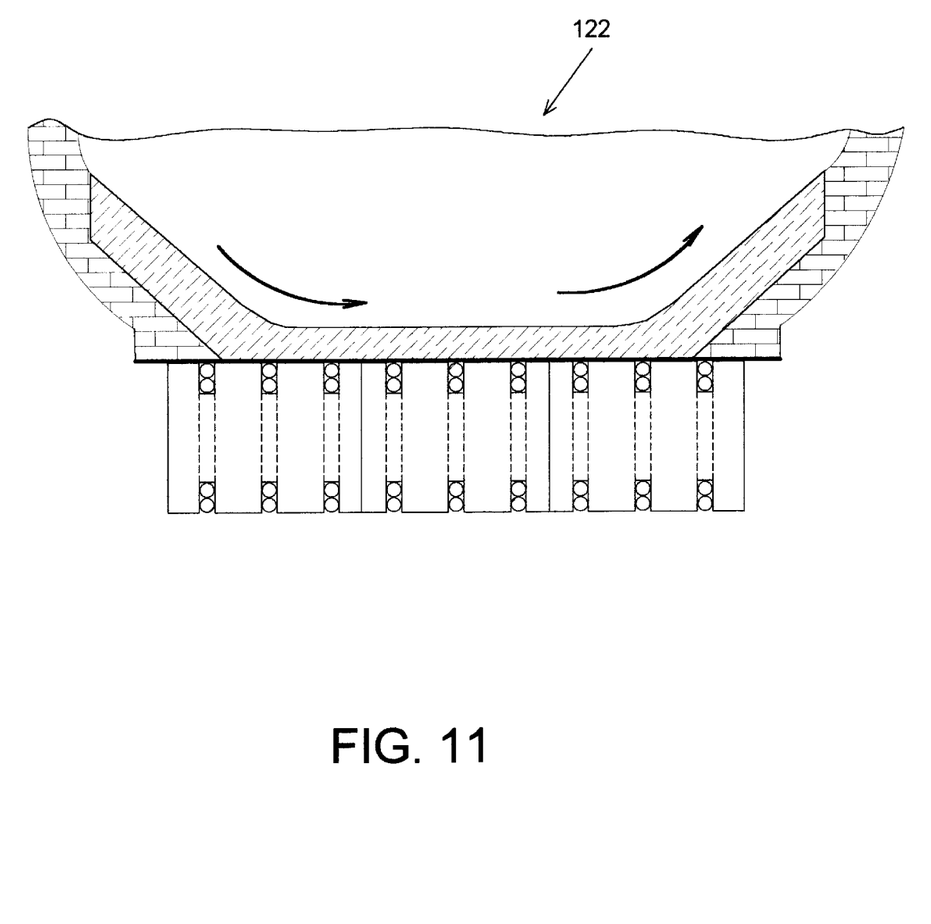
FIG. 11 is an enlarged horizontally-oriented sectional partial view for describing another modified stirring passageway embodiment of the invention.

In yet another embodiment of a passageway depicted in FIG. 11, a column is absent from passageway 122. Such embodiment is preferred for use with smaller furnaces in the range of about 30 metric tons or less.

Such column(s) separating the passageway from the vessel function also to protect the wall of the passageway from damage during furnace charging.

Dimensional relationships between the column(s), passageway wall and magnetic field source are tabulated and presented in Tables II, III and IV below, for preferred embodiments of furnaces having a range of capacities between about 30–100 metric tons and having circular and rectangular cross sections in a horizontal plane.

TABLE II

| Furnace | |
|---|---|
| Capacity | About 30 Metric Tons |
| Inside Dimensions | 3 × 5 meters (rectangular) or 3–4 Meters Diameter (circular) |
| Depth of Metal in Furnace | .6–.8 Meters |
| Stirring Apparatus | |
| Column(s) | None |
| Passageway Central Wall Length | 70 Centimeters |
| Magnetic Field Source Core Length | 90 Centimeters |
| Number of Poles | 2 |
| Length of Each Pole | 45 Centimeters |
| Angle Between End Wall and Longitudinal Axis | 30° |
| Thickness of Central Wall | 7 Centimeters |
| Molten Metal Moved Through Passageway | 4–5 Metric Tons/Min |
| Velocity of Molten Metal Through Passageway | 1.0–1.4 Meters/Sec |

TABLE III

| Furnace | |
|---|---|
| Capacity | 30–70 Metric Tons |
| Inside Dimensions | 5 × 6 Meters (rectangular) or 4–5 Meters Diameter (circular) |
| Depth of Metal in Furnace | .7–.9 Meters |
| Stirring Apparatus | |
| Column | One (elliptical shape) |
| Major Dimension of Ellipse | 40 Centimeters |
| Minor Dimension of Ellipse | 20 Centimeters |
| Minimum Distance Between Column and Wall | 18 Centimeters |
| Passageway Central Wall Length | 70 Centimeters |
| Magnetic Field Source Core Length | 90 Centimeters |
| Number of Poles | 2 |
| Length of Each Pole | 45 Centimeters |
| Angle Between End Wall and Longitudinal Axis | 30° |
| Thickness of Central Wall | 7 Centimeters |
| Molten Metal Moved Through Passageway | 5–11 Metric Tons/Min |
| Velocity of Molten Metal in Passageway | 1.0–1.4 Meters/Sec |

TABLE IV

| Furnace | |
|---|---|
| Capacity | 70–100 Metric Tons |
| Inside Diameter | 6 Meters (circular) |
| Depth of Metal in Furnace | .9–1.1 Meters |
| Stirring Apparatus | |
| Columns | Two (elliptical shape) |
| Major Dimension of Each Ellipse | 25 Centimeters |
| Minor Dimension of Each Ellipse | 12 Centimeters |
| Opening Between Columns | 35 Centimeters |
| Minimum Distance Between Partitions and Wall | 20 Centimeters |
| Passageway Central Wall Length | 85 Centimeters |

TABLE IV-continued

| | |
|---|---|
| Magnetic Field Source Core Length | 105 Centimeters |
| Number of Poles | 3 |
| Length of Each Pole | 35 Centimeters |
| Angle Between End Wall and Longitudinal Axis | 30° |
| Thickness of Central Wall | 7 Centimeters |
| Molten Metal Moved Through Passageway | 11–16 Metric Tons/Min |
| Velocity of Molten Metal in Passageway | 1.0–1.4 Meters/Sec |

Figure 12:
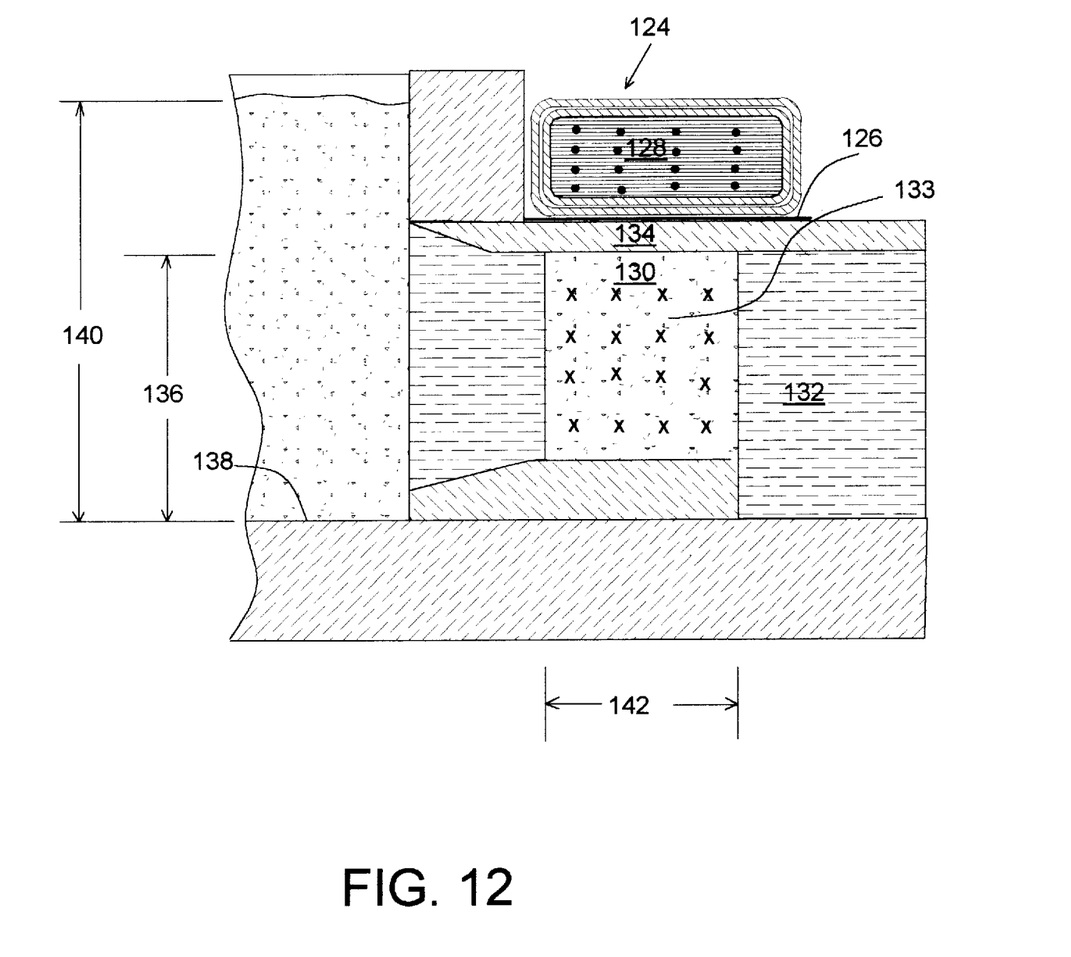
FIG. 12 is an enlarged cross-sectional partial side view taken in vertically-oriented plane for describing structural modifications of another embodiment of the invention shifted ninety degrees (90°) counter-clockwise from that shown in FIGS. 3, 5.

Another embodiment of the invention provides for locating the magnetic field source such that the mounting plate and source are oriented horizontally. Such embodiment is shown in FIG. 12 with magnetic field source 124. In FIG. 12, mounting plate 126 is shown in such horizontal orientation. Such orientation is in contrast with the vertical orientation of mounting plate 50 in FIG. 2. In FIG. 12, a vertical section taken at a furnace location similar to that indicated by interrupted line 3—3 of FIG. 2, apparatus is shown as well as a schematic representation of lines of flux of the magnetic field. In such representation, the lines of magnetic flux (substantially perpendicular to the plane of the drawing sheet) are shown as dots within the core 128 of the magnetic field source and as x's within the molten metal 130.

Advantages of such horizontally oriented mounting include:

1) The thickness dimension of passageway wall 132, partially defining passageway 133, is not required to be thin enough to allow the magnetic field to act through it, as is the case with embodiments as depicted in FIG. 2. Such consideration is important on large furnaces having a molten metal depth that would exert hydrostatic pressure on the passageway wall of a magnitude greater than such necessarily thin passageway wall could withstand. In the embodiment of FIG. 12, the thickness of passageway wall 132 is not limited by the thickness through which the magnetic field can act. With the location of the horizontally mounted magnetic field source 124, the hydrostatic pressure on wall 134, through which the magnetic field must act, is significantly reduced since such horizontally-oriented wall is located at a distance measured vertically and indicated at 136, above the furnace bottom surface, 138. Such distance is equal to about 70% of the molten metal depth indicated at 140.

2) Repair or replacement of the wall 134 through which the magnetic field must act can be made more easily by reducing the contents of the furnace to a level of about 60% full, in comparison with substantially emptying the furnace.

3) Magnetic field source dimensions and resulting amount of molten metal subject to influence can be increased by increasing the passageway dimension indicated at 142. Such increase in a comparable manner in the embodiment depicted in FIG. 3 at 144 is not possible due to the requirement of limiting stirring action to metal not located near the furnace bottom surface or the top surface of the molten metal.

While specific materials, dimensional data, and processing steps have been set forth for purposes of describing embodiments of the invention, various modifications can be resorted to, in light of the above teachings, without departing from applicant's novel contributions; therefore, in determining the scope of the present invention reference shall be made to the appended claims.

What is claimed is:

1. Method for stirring molten metal during processing within a metallurgical vessel, comprising A. providing a vertically-oriented metallurgical vessel for holding a main body of molten metal within a periphery defined by refractory lining;

B. establishing a molten metal passageway contiguous to such vessel periphery, such passageway:
(i) being partially defined between a substantially vertically-oriented refractory column in combination with a refractory wall structure presenting a substantially-planar vertically-oriented central portion, and
(ii) communicating with such main body of molten metal of such vessel, enabling
substantially horizontally-oriented non-turbulent movement of molten metal, between such refractory column and such refractory wall structure:
(a) into such passageway,
(b) through such passageway, and
(c) returning molten metal from such passageway to such main body of molten metal of such vessel;

C. positioning an elongated magnetically-permeable core which is substantially symmetrically disposed in relation to a centrally-located longitudinal axis of such core, D. positioning a plurality of individual electrically-conductive windings in linearly-spaced relationship along such elongated core, E. cyclically establishing lines of magnetic flux for influencing such molten metal to cause such non-turbulent horizontally-oriented movement in such passageway, with such lines of magnetic flux being:
(i) concentrated in molten metal in such passageway, and
(ii) established by alternately electrically exciting such linearly-spaced windings;

F. vertically limiting such horizontally-oriented movement of molten metal through such passageway, by selectively locating baffle means:
(i) contiguous to an upper surface portion of such main body of molten metal of such vessel, and
(ii) contiguous to a bottom portion of such main body of molten metal of such vessel.

2. The method of claim 1, including
A. positioning such elongated magnetically permeable core longitudinal axis in a substantially-parallel relationship to the substantially-planar vertically-oriented central portion of such refractory wall defining such passageway;
B. establishing substantially-planar refractory entrance and exit end portions, flanking such refractory wall central portion defining such passageway and having a selected angled relationship with such central portion; and
C. providing refractory wall transition portions, intermediate each such end portion and such centrally-located portion of such refractory wall, for smooth transition of molten metal within such passageway.

3. The method of claim 2, including
selecting a length for such elongated magnetically permeable core, and
positioning the electrically-conductive windings on such elongated magnetically permeable core, with
at least one of such electrical windings contiguous to each end of such substantially-parallel core, to
extend longitudinally beyond such substantially-planar central portion of such refractory wall.

4. The method of claim 2, including
selecting an angle between such substantially-planar central portion of the passageway refractory wall, and such flanking substantially-planar end portions in the range of about 10°–40°.

5. The method of claim 1, including
locating such baffle means, for blocking an upper surface portion of main body molten metal from entrance into such passageway, to partially define a ceiling of the passageway, at a distance from a bottom refractory lining of such vessel which is about 0.7 times the depth of such molten metal, and
locating such baffle means, for blocking a bottom portion of main body molten metal from entrance into such passageway, to partially define a floor of the passageway, at a distance from such bottom refractory lining of such vessel which is about 0.1 times the depth of such main body molten metal.

6. The method of claim 1, including
electrically exciting each such linearly-spaced winding in out-of-phase relationship with each adjacent linearly-spaced winding.

7. The method of claim 6, including
selecting a symmetrical three-phase power source for electrically exciting such spaced windings.

8. The method of claim 7, including
selecting a voltage in the range of about 380–460 volts,
a power input in the range of about 50–100 kilowatts, and
a frequency in the range of about 50–60 cycles per second for such power source.

9. The method of claim 1, including
establishing:
lines of magnetic flux in the range of about 800–1600 gauss, and
a magnetic field travel effect in the range of 30–70 meters per second, so as to
attain a numeric factor consisting of magnetic field strength times the square root of the magnetic field travel effect, which is in the range of 5,000–10,000.

10. Apparatus for stirring molten metal during processing within a metallurgical vessel, comprising A. a vertically-oriented metallurgical vessel for holding a main body of molten metal within a periphery defined by refractory lining;

B. a passageway for molten metal contiguous to such vessel periphery;

such passageway:
(i) being defined, at least partially, between a substantially vertically-oriented refractory column in combination with a refractory wall structure presenting a substantially-planar vertically-oriented central portion, and
(ii) communicating with such main body of molten metal of such vessel, enabling
substantially horizontally-oriented non-turbulent movement of molten metal between such refractory column and such refractory wall structure:
(a) into such passageway,
(b) through such passageway, and (c) returning molten metal from such passageway to such main body of molten metal of such vessel;
C. an elongated magnetically permeable core which is substantially symmetrically disposed in relation to a centrally-located longitudinal axis of such core;
D. a plurality of individual electrically-conductive windings in linearly-spaced relationship along such elongated core;
E. means for cyclically establishing lines of magnetic flux for influencing such molten metal to cause such non-turbulent horizontally-oriented movement in such passageway, with
such lines of magnetic flux being:
   (i) concentrated in molten metal in such passageway, and
   (ii) established by means for alternately electrically exciting such linearly-spaced windings;
F. baffle means to vertically limit such passageway substantially blocking entry of portions of such main body of molten metal through such passageway,
such baffle means being located contiguous to:
   (i) an upper surface portion of such main body molten metal of such vessel, and
   (ii) a bottom portion of such main body of molten metal of such vessel.

11. The apparatus of claim 10, in which
such longitudinal axis of the elongated magnetically permeable core is positioned substantially parallel to the substantially-planar vertically-oriented central portion of the refractory wall, with
such refractory wall including:
   A. two substantially-planar refractory entrance and exit end portions flanking such central portion, with each such end portion having a selected angled relationship with such central portion, and
   B. refractory transition portions intermediate each such end portion and central portion for smooth transition of molten metal within such passageway.

12. The apparatus of claim 11, in which
such selected length of such elongated magnetically permeable core is such that at least one electrically-conductive winding contiguous to each end of such core extends longitudinally beyond such substantially-planar central portion of such refractory wall.

13. The apparatus of claim 11, in which
such selected angle between such passageway substantially-planar refractory wall central portion and each of its flanking end portions is in the range of about 10°–40°.

14. The apparatus of claim 10, in which
such baffle means, for blocking upper surface portions of such molten metal from entrance into such passageway, partially defines a ceiling of the passageway located a distance from a bottom refractory lining of such vessel of about 0.7 times a depth of such molten metal, and
such baffle means, for blocking a bottom portion of such molten metal from entrance into such passageway, partially defines a floor of the passageway located a distance from such bottom refractory lining of about 0.1 times such depth of the molten metal.

15. The apparatus of claim 10, in which
such means for alternately electrically exciting each such linearly-spaced electrically conductive winding provides for out-of-phase relationship of each winding with each adjacent linearly-spaced electrically conductive winding.

16. The apparatus of claim 15, in which such means for electrically exciting such windings, comprises
a symmetrical three-phase power source.

17. The apparatus of claim 16, in which such means provides
a voltage in the range of about 380–460 volts, at a frequency in the range of about 50–60 cycles per second, with
current to provide power input in the range of about 50–100 kilowatts.

18. The apparatus of claim 15, in which such electrically-conductive windings, supplied by means providing such out-of-phase relationship, establishes
lines of magnetic flux in the range of 800–1600 gauss, and
a magnetic field travel effect, from such out-of-phase relationship of such linearly spaced electrically conductive windings, in the range of 30–70 meters per second.

* * * * *